(12) United States Patent
Matsumoto et al.

(10) Patent No.: US 9,335,792 B2
(45) Date of Patent: May 10, 2016

(54) DOCKING DEVICE

(71) Applicant: Kabushiki Kaisha Toshiba, Minato-ku, Tokyo (JP)

(72) Inventors: Takuo Matsumoto, Hamura Tokyo (JP); Tetsuo Okazaki, Hino Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/638,164

(22) Filed: Mar. 4, 2015

(65) Prior Publication Data

US 2016/0062402 A1 Mar. 3, 2016

(30) Foreign Application Priority Data

Aug. 29, 2014 (JP) ................................. 2014-176081

(51) Int. Cl.
*G06F 1/16* (2006.01)

(52) U.S. Cl.
CPC ............ *G06F 1/1632* (2013.01); *G06F 1/1626* (2013.01); *G06F 1/1654* (2013.01)

(58) Field of Classification Search
CPC .................................................. G06F 1/1632
USPC ................................................... 361/679.43
See application file for complete search history.

(56) References Cited

U.S. PATENT DOCUMENTS

| | | | | |
|---|---|---|---|---|
| 7,599,178 B2 * | 10/2009 | Huang | ................... | G06F 1/1632 361/679.28 |
| 8,391,000 B2 | 3/2013 | Saito et al. | | |
| 2014/0177162 A1 * | 6/2014 | Ho | ........................ | G06F 1/1616 361/679.43 |
| 2015/0055289 A1 * | 2/2015 | Chang | ................... | G06F 1/1632 361/679.43 |

FOREIGN PATENT DOCUMENTS

| | | |
|---|---|---|
| JP | H05-79624 U | 10/1993 |
| JP | H11-053052 A | 2/1999 |
| JP | 2011-065616 A | 3/2011 |

* cited by examiner

*Primary Examiner* — Anthony Q Edwards
(74) *Attorney, Agent, or Firm* — Knobbe, Martens, Olson & Bear, LLP

(57) ABSTRACT

A docking device according to an embodiment, on which an electronic apparatus is mounted in a demountable manner, includes a hook member, a hook interlocking member interlocking with the hook member and a latching member. By the operation to a demount-operating part, the hook member slidingly moves from a locking position where the hook member engages with an engaging hole of the electronic apparatus, to an unlocking position where the hook member does not engage with the engaging hole. When the electronic apparatus is not mounted on the docking device, the latching member is pressed up to a first level where it does not latch the hook interlocking member, and protrudes from a mounting surface on which the electronic apparatus is mounted. When the electronic apparatus is mounted, the latching member is pressed down to a second level where it can latch the hook interlocking member.

14 Claims, 8 Drawing Sheets

DOCKING DEVICE

CROSS-REFERENCE TO RELATED APPLICATIONS

This application is based upon and claims the benefit of priority from Japanese Patent Application No. 2014-176081, filed Aug. 29, 2014; the entire contents of which are incorporated herein by reference.

FIELD

Embodiments described herein relate generally to a docking device.

BACKGROUND

In recent years, with the popularization of tablet terminals, there has been developed a personal computer (so-called 2in1 tablet pc) that can be used like a notebook personal computer, by mounting an electronic apparatus such as a tablet terminal on a docking device having an input interface such as a keyboard and a touchpad.

In a conventional 2in1 tablet pc, when demounting a tablet terminal from a docking device, it is necessary that a user slides an EJECT button, and pulls and demounts the tablet terminal from the docking device in a state in which a hook interlocking with the EJECT button slidingly moves to an unlocking position. That is, when demounting the tablet terminal, the user must keep the state of sliding the EJECT button, and sometimes cannot easily demount the tablet terminal.

Further, the conventional 2in1 tablet pc has the following problems. Since the tablet terminal is heavy, there is a possibility that the tablet terminal mounted on the docking device falls backward at the time of use. That is, for example, when the tablet terminal is opened so as to form a predetermined angle with respect to the docking device or when the touch panel of the tablet terminal is operated to apply a touch load to the tablet terminal, there is a possibility that the tablet terminal falls backward. Therefore, conventionally, a stand that can be drawn out of the back edge of the docking device is provided, for avoiding the fall of the tablet terminal. However, because of the large size, the stand obstructs the thinning and space-saving of the 2in1 tablet pc.

BRIEF DESCRIPTION OF THE DRAWINGS

FIG. 4 is an enlarged side view in which FIG. 2 is enlarged centering on a mounting part 12 of the docking device 1;

DETAILED DESCRIPTION

Figure 1:
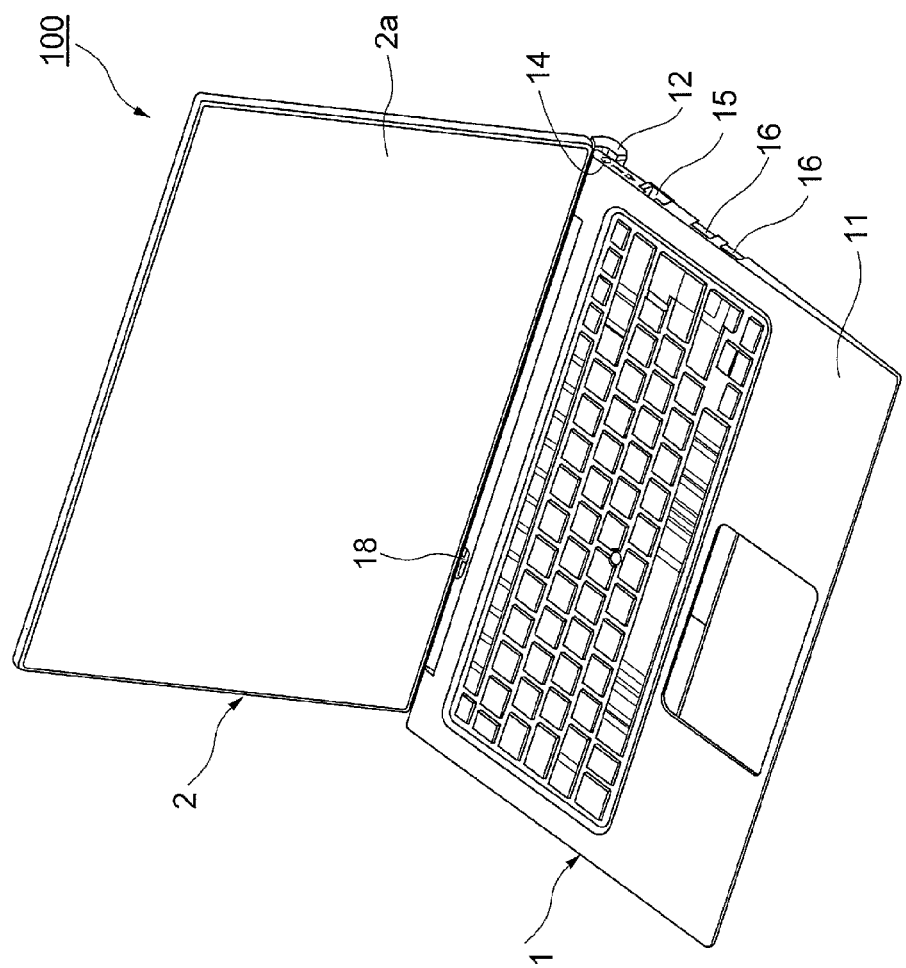
FIG. 1 is a perspective view of a computer device 100 that includes a docking device 1 according to an embodiment and an electronic apparatus 2 mounted on the docking device 1.

A docking device according to an embodiment, which is a docking device on which an electronic apparatus is mounted in a demountable manner, includes a hook member, a hook interlocking member interlocking with the hook member, and a latching member. By the operation to a demount-operating part, the hook member slidingly moves from a locking position at which it engages with an engaging hole of the electronic apparatus, to an unlocking position at which it does not engage with the engaging hole.

When the electronic apparatus is not mounted on the docking device, the latching member is pressed up to a first level at which it does not latch the hook interlocking member, by the biasing force of an elastic member, and protrudes from a mounting surface on which the electronic apparatus is mounted. When the electronic apparatus is mounted on the docking device, the latching member is pressed down to a second level at which it can latch the hook interlocking member, against the biasing force of the elastic member, by the pressing force from the electronic apparatus.

Further, the docking device according to the embodiment, which is a docking device on which an electronic apparatus is mounted in a demountable manner, includes a body part and a mounting part. The mounting part is attached in a rotatable manner to one edge of the body part through a hinge, and the electronic apparatus is mounted thereon. Further, the mounting part has a supporting surface which connects, in a close state in which a displaying surface of the electronic apparatus and a top surface of the body part face, a back surface opposite to the displaying surface and a bottom surface opposite to the top surface. In an open state in which the displaying surface and the top surface form an angle, the supporting surface has a contacting surface which contacts with a placing surface on which the docking device is placed. In the open state, the contacting surface is positioned backward of a rotation axis of the hinge.

Hereinafter, a docking device according to an embodiment will be concretely explained with reference to the drawings. Here, in the respective figures, an identical reference character is assigned to constituent elements having an equivalent function, and the concrete explanation of the constituent elements with the identical reference character is not repeated.

(Structure Relevant to Fall Prevention of Electronic Apparatus)

Figure 2:
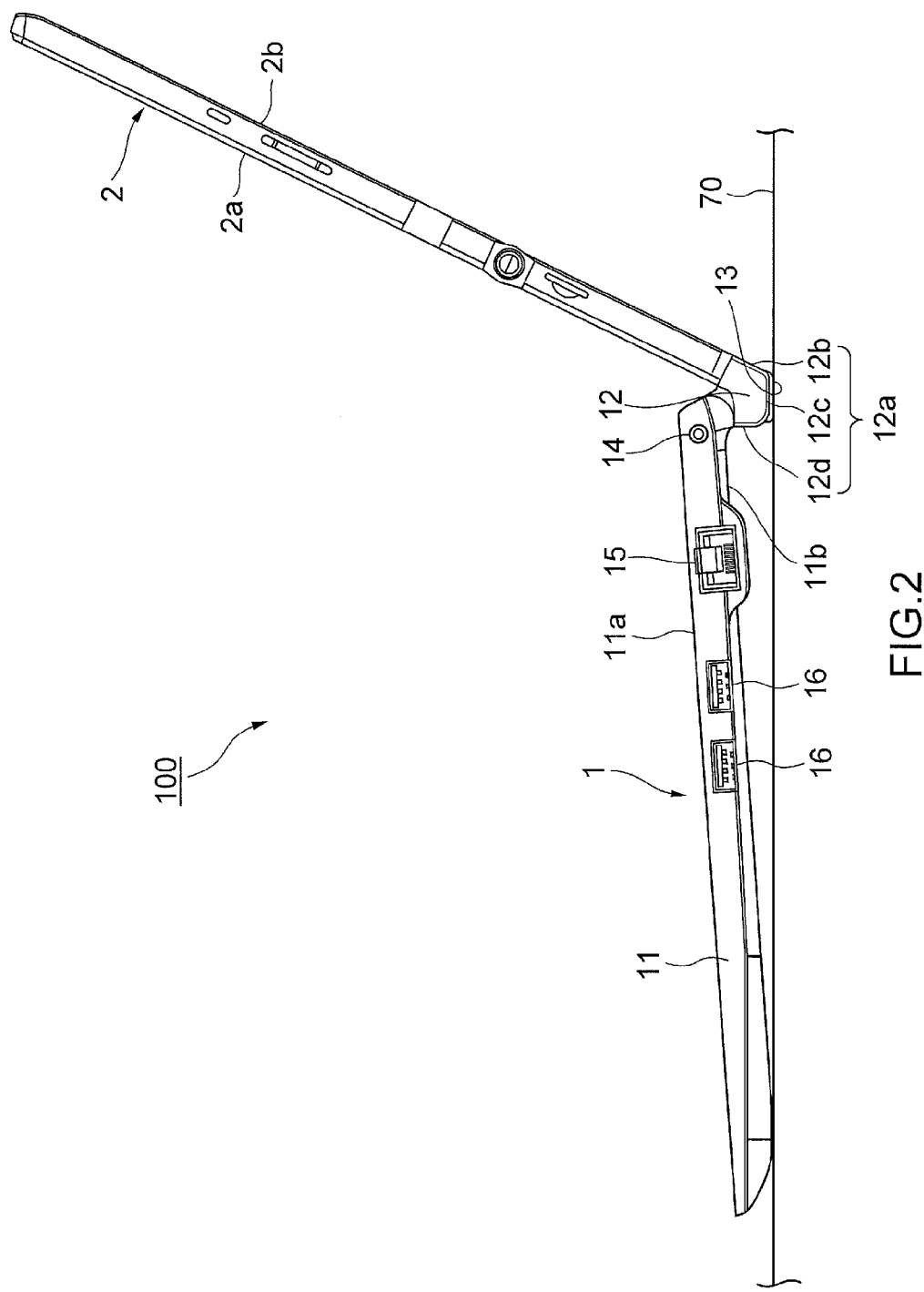
FIG. 2 is a side view of the computer device 100 in a state in which the electronic apparatus 2 mounted on the docking device 1 is opened.
Figure 3:
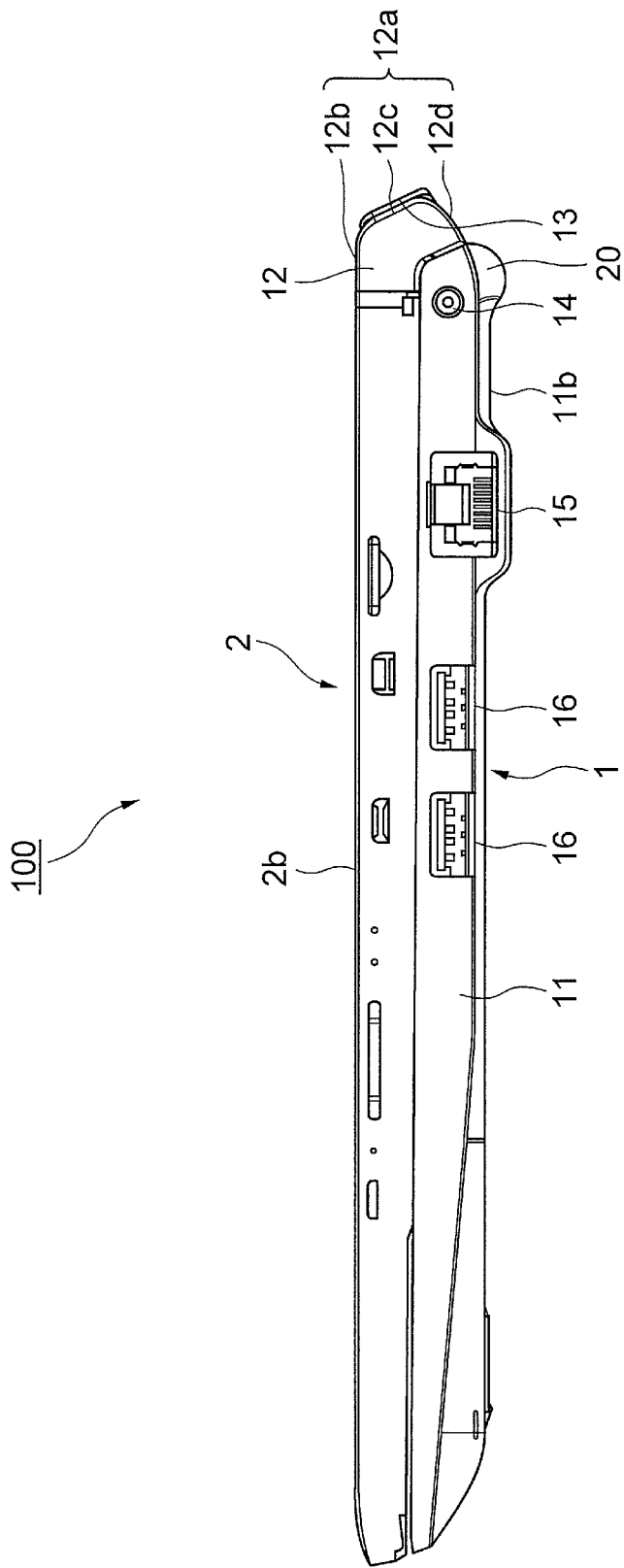
FIG. 3 is a side view of the computer device 100 in a state in which the electronic apparatus 2 mounted on the docking device 1 is closed.
Figure 4:
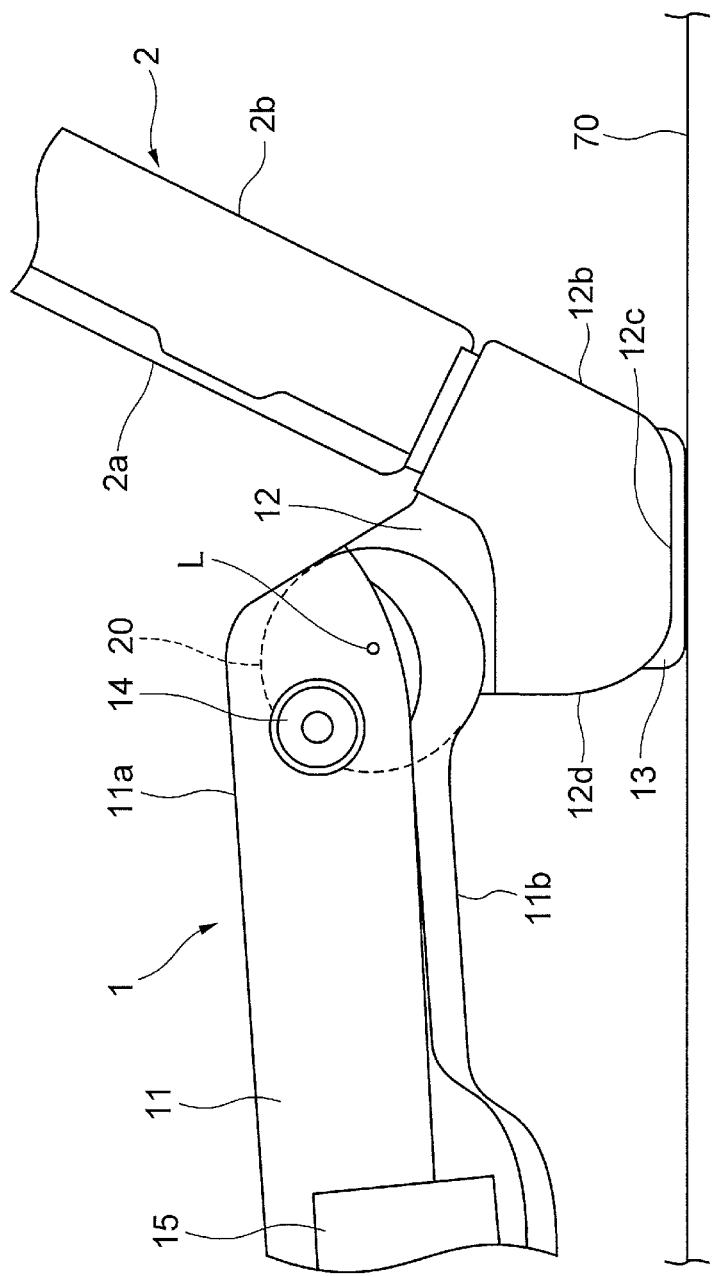

A docking device 1 according to the embodiment will be explained with reference to FIG. 1 to FIG. 4. FIG. 1 shows a perspective view of a computer device 100 that includes the docking device 1 and an electronic apparatus 2. FIG. 2 shows a side view of the computer device 100 in a state in which the electronic apparatus 2 mounted on the docking device 1 is opened. FIG. 3 shows a side view of the computer device 100 in a state in which the electronic apparatus 2 mounted on the docking device 1 is closed. FIG. 4 shows an enlarged side view in which FIG. 2 is enlarged centering on a mounting part 12 of the docking device 1.

The computer device 100 includes the docking device 1 according to the embodiment, and the electronic apparatus 2 mounted on the docking device 1. For example, the electronic apparatus 2 is a tablet terminal. The electronic apparatus 2 has a displaying surface 2a such as a touch panel. The electronic apparatus 2 is mounted in a demountable manner on the docking device 1 through the mounting part 12 of the docking device 1.

The docking device 1 is configured such that the electronic apparatus 2 is mounted in a demountable manner, and includes a body part 11 and the mounting part 12. As shown in FIG. 1 and FIG. 2, a keyboard and a touchpad are provided on a top surface (operating surface) 11a of the body part 11, and a power connector 14, a communication connector 15, a USB® connector 16 and the like are provided on a side surface of the body part 11.

Further, the mounting part 12 is provided at one edge of the body part 11. For more detail, the mounting part 12 is attached in a rotatable manner at one edge of the body part 11 through a hinge 20. The electronic apparatus 2 is mounted on the mounting part 12, and therefore, the electronic apparatus 2 can be rotated with respect to the docking device 1. Thereby, a user can adjust the angle of the electronic apparatus 2, for example, such that an image displayed on the displaying surface 2a is easily viewable.

Here, a demount-operating part (EJECT button) 18 shown in FIG. 1 is used when the electronic apparatus 2 mounted on the docking device 1 is demounted. For more detail, a user slides the demount-operating part 18 in a predetermined direction (the leftward direction, in the embodiment). Thereby, hook members 21, 22 (described later) of the mounting part 12 slidingly move to unlocking positions at which they do not engage with engaging holes (not shown) of the electronic apparatus 2, resulting in a state in which the electronic apparatus 2 can be demounted.

The demount-operating part 18 is attached to one end of an elastic member (not shown) provided in the mounting part 12. The demount-operating part 18 is configured to return to the original position by the biasing force of the elastic member, when the operation by a user is not performed.

The mounting part 12 has a supporting surface 12a that forms a portion of the outer surface thereof. As shown in FIG. 3, in a state in which the displaying surface 2a of the electronic apparatus 2 and the top surface 11a of the body part 11 face (hereinafter, referred to as merely a "close state"), the supporting surface 12a connects a back surface 2b opposite to the displaying surface 2a of the electronic apparatus 2, and a bottom surface 11b opposite to the top surface 11a of the body part 11.

In a state in which the displaying surface 2a of the electronic apparatus 2 and the top surface 11a of the body part 11 form an angle (hereinafter, referred to as merely an "open state"), the supporting surface 12a contacts with a placing surface 70.

For more detail, as shown in FIG. 2 to FIG. 4, the supporting surface 12a includes a first surface 12b, a second surface 12c and a third surface 12d. The first surface 12b is a surface that is connected with the back surface 2b of the electronic apparatus 2 in the mounted state of the electronic apparatus 2. The second surface 12c is a surface that is connected with the first surface 12b. The third surface 12d is a surface that is connected with the second surface 12c and that is connected with the bottom surface 11b of the body part 11.

As shown in FIG. 3, in the close state, the second surface 12c forms a side surface on the back side of the computer device 100. When the electronic apparatus 2 is opened, the mounting part 12 rotates around the rotation axis of the hinge 20, together with the electronic apparatus 2, and as shown in FIG. 2, the second surface 12c comes into contact with the placing surface 70, through a cushion member 13 (described later).

As shown in FIG. 4, in the open state, the second surface 12c contacting with the placing surface 70 is positioned backward of the rotation axis L of the hinge. Thereby, the stability of the electronic apparatus 2 in the open state is enhanced, and the fall of the electronic apparatus 2 is prevented. Further, even when the electronic apparatus 2 is subjected to a touch load from a user, it is possible to prevent the electronic apparatus 2 from falling.

Here, for enhancing the stability of the electronic apparatus 2, preferably, the whole of the second surface 12c (or the cushion member 13 described later) should be positioned backward of the rotation axis L, in the open state. However, this is not essential, and at least a portion of the second surface 12c may be positioned backward of the rotation axis L.

Further, in a state in which the displaying surface 2a of the electronic apparatus 2 and the top surface 11a of the body part 11 form a predetermined angle therebetween, the second surface 12c may be set roughly parallel to the placing surface 70. In this case, for example, the predetermined angle may be an angle (for example, 120 degrees) that is the maxim angle formed between the displaying surface 2a and the top surface 11a, or may be an angle at which the user operating the docking device 1 can most nicely see the display of the electronic apparatus 2. By doing so, the second surface 12c contacts with the placing surface 70 in a surface-to-surface contact manner in a predetermined (for example, frequent) use condition, allowing for the increase in the stability of the computer device 100 placed on the placing surface 70.

Further, as shown in FIG. 2 to FIG. 4, the cushion member 13 may be provided on the second surface 12c of the supporting surface 12a. The cushion member 13 is made of rubber or plastic, for example. Thereby, it is possible to prevent the supporting surface 12a from being hurt by being scraping against the placing surface 70, and to prevent the docking device 1 from slipping against the placing surface 70 in the open state.

Further, as shown in FIG. 2, the mounting part 12 may be configured to raise the body part 11 in the open state, such that one edge (the right edge in FIG. 2) of the body part 11 is higher than the other edge (the left edge in FIG. 2) of the body part 11. That is, the mounting part 12 may be configured to function as a tilt stand in the open state. Thereby, the top surface 11a of the body part 11 has an angle with respect to the placing surface 70, allowing for the facilitation of the character input and the like through the keyboard.

As described above, the second surface 12c of the supporting surface 12a of the mounting part 12, which contacts with the placing surface 70 in the open state, is positioned backward of the rotation axis L of the hinge. Therefore, according to the embodiment, it is possible to enhance the stability of the electronic apparatus 2 in the open state, and to prevent the fall of the electronic apparatus 2. Further, even when the displaying surface 2a of the electronic apparatus 2 is touched by a user and is subjected to a touch load, it is possible to prevent the electronic apparatus 2 from falling.

Furthermore, according to the embodiment, it is unnecessary to provide a large accessory such as a stand for stabilizing the electronic apparatus 2 mounted on the docking device. Therefore, it is possible to prevent the fall of the electronic apparatus 2, without interfering with the thinning and space-saving of the computer device 100.

(Structure Relevant to Facilitation of Demounting of Electronic Apparatus)

Next, the configuration of the mounting part 12 of the docking device 1 will be explained in detail, with reference to FIG. 5 to FIG. 8.

Figure 5:
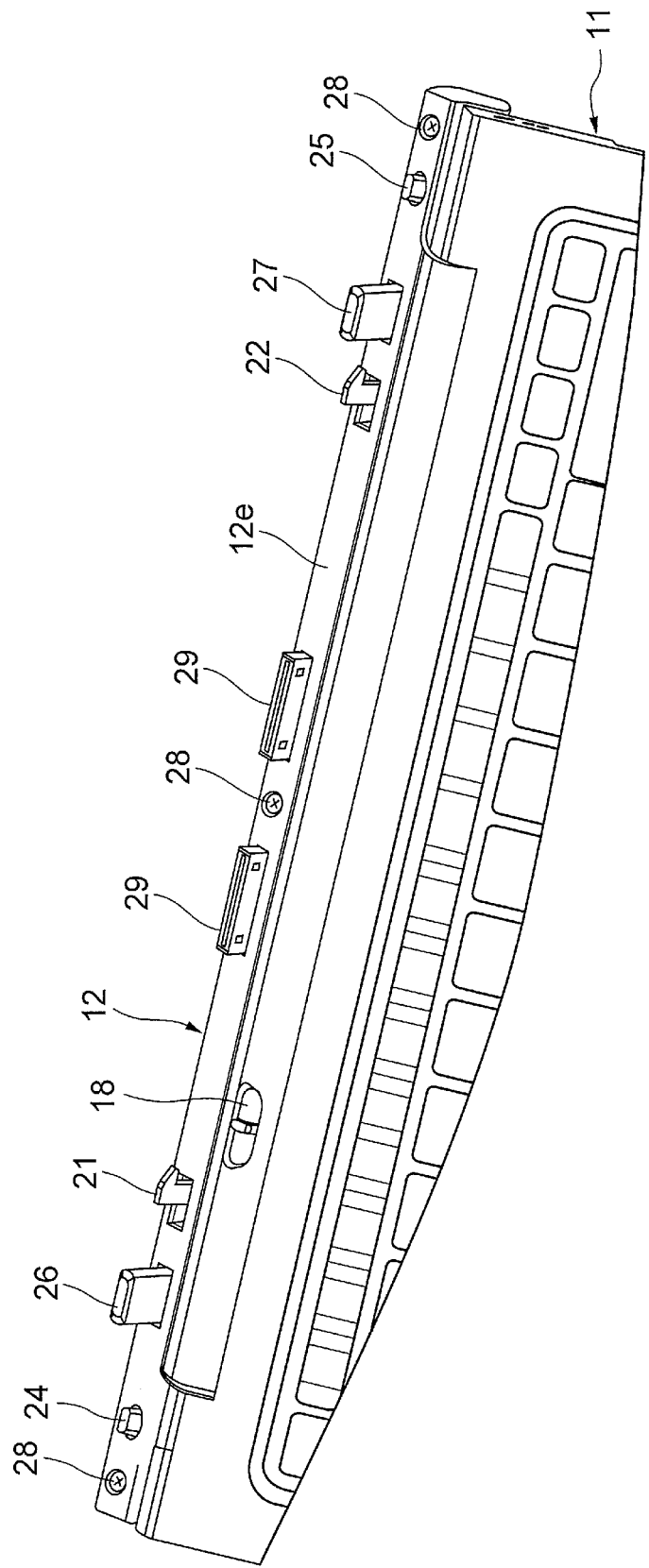
FIG. 5 is a perspective view of the mounting part 12 of the docking device 1.

FIG. 5 is a perspective view of the mounting part 12 of the docking device 1. As shown in FIG. 5, the hook members 21, 22, latching members (EJECT support pin) 24, 25, guide-pin members 26, 27, screws 28 for hinge cover fixation, and connectors 29 are provided on a mounting surface 12e (corresponding to a top surface of a hinge cover) of the mounting part 12.

As shown in FIG. 5, with respect to the center of the mounting surface 12e, the hook member 21 and the hook member 22 are provided roughly symmetrically, the latching member 24 and the latching member 25 are provided roughly symmetrically, and the guide-pin member 26 and the guide-pin member 27 are provided roughly symmetrically.

Since the latching member 24 and the latching member 25 are provided roughly symmetrically with respect to the center of the mounting surface 12e, when the electronic apparatus 2 is demounted from the docking device 1, the electronic apparatus 2 is raised roughly parallel to the mounting surface 12e, resulting in a facilitation of the demounting of the electronic apparatus 2.

Further, as shown in FIG. 5, the latching member 24 and the latching member 25 may be arranged to be close to edge sides of the mounting part 12, relatively to the hook member 21 and the hook member 22, respectively. By so arranging, when the electronic apparatus 2 is demounted from the docking device 1, the electronic apparatus 2 is easily raised parallel to the mounting surface 12e, resulting in a further facilitation of the demounting of the electronic apparatus 2.

The hook members 21, 22 are members for fixing the electronic apparatus 2 to the docking device 1, by engaging with the engaging holes (not shown) provided on a side surface of the electronic apparatus 2. The hook member 21 and the hook member 22 slidingly move in the longitudinal direction of the mounting part 12, while interlocking with the demount-operating part 18. For more detail, by the operation to the demount-operating part 18, the hook members 21, 22 slidingly move from locking positions at which they engage with the engaging holes of the electronic apparatus 2, to unlocking positions at which they do not engage with the engaging holes. Here, the engaging holes of the electronic apparatus 2 are provided on the side surface that faces the mounting surface 12e when the electronic apparatus 2 is mounted on the mounting part 12. The engaging holes are provided at two points on the side surface of the electronic apparatus 2, corresponding to the hook members 21, 22.

As described above, the demount-operating part 18 is configured to return to the original position by the biasing force of the elastic member, when the operation is not performed. Therefore, when the demount-operating part 18 is not operated, the hook members 21, 22 are at the locking positions.

By the operation to the demount-operating part 18, the demount-operating part 18 slidingly moves in a predetermined direction (in the embodiment, the longitudinal direction of the mounting part 12), and the hook members 21, 22 slidingly move in the direction, while interlocking with the demount-operating part 18.

The latching member 24 is a member for latching a hook interlocking member 23 described later and fixing the hook members 21, 22 to the unlocking positions when the demount-operating part 18 is operated in the state in which the electronic apparatus 2 is mounted on the docking device 1.

Here, the latching member 25 does not latch the hook interlocking member 23. However, when the electronic apparatus 2 is demounted, the latching member 25, together with the latching member 24, presses up the electronic apparatus 2, by the biasing force of an elastic member attached to the latching member 25. This facilitates the demounting of the electronic apparatus 2 from the docking device 1.

As shown in FIG. 5, the latching members 24, 25 are provided such that the upper portions protrude from the mounting surface 12e by the biasing force of elastic members (not shown) such as compression springs, in the state in which the electronic apparatus 2 is not mounted on the docking device 1. At the time of the mounting of the electronic apparatus 2, the latching members 24, 25 abut the side surface of the electronic apparatus 2 to be pressed down.

The guide-pin members 26, 27, which are inserted into guide-pin inserting holes (not shown) provided on the side surface of the electronic apparatus 2 at the time of the mounting of the electronic apparatus 2, are members for supporting the electronic apparatus 2 mounted on the docking device 1. As shown in FIG. 5, the guide-pin member 26 is provided so as to protrude from the mounting surface 12e between the hook member 21 and the latching member 24. Further, the guide-pin member 27 is provided so as to protrude from the mounting surface 12e between the hook member 22 and the latching member 25.

The connectors 29, which are electrically connected with connectors (not shown) provided on the side surface of the electronic apparatus 2 when the electronic apparatus 2 is mounted, transmit control signals and electric power to be exchanged between the docking device 1 and the electronic apparatus 2.

Figure 6A:
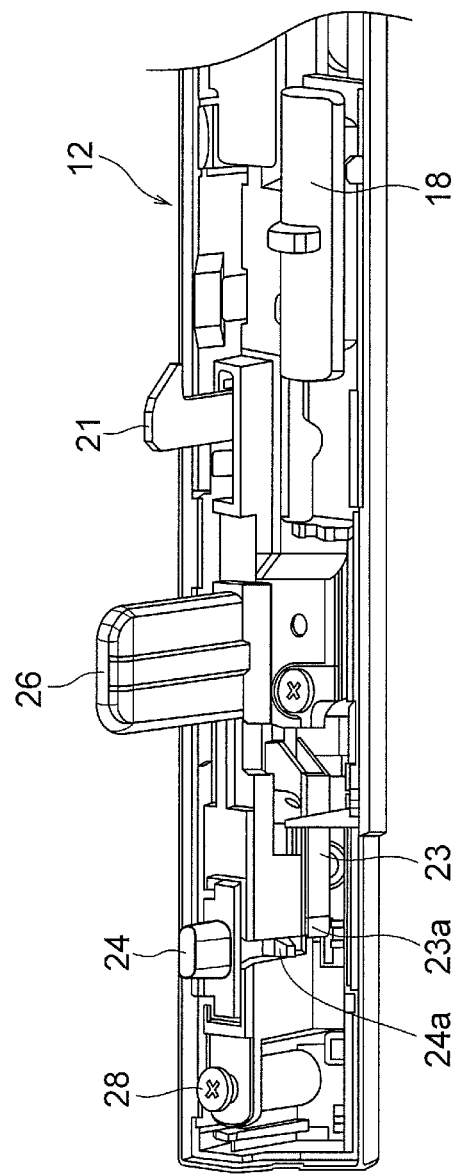
FIG. 6A is a perspective view of a left-side portion of the mounting part 12 in a state in which a hinge cover is detached.

Next, the internal configuration of the mounting part 12 will be explained with reference to FIGS. 6A and 6B. FIG. 6A shows a perspective view of a left-side portion of the mounting part 12 in a state in which the hinge cover is detached, and FIG. 6B shows a perspective view of a right-side portion of the mounting part 12 in the same state.

As shown in FIG. 6A, the hook interlocking member (hook holder) 23 is provided in the mounting part 12. The hook interlocking member 23, in which one end is connected with the hook member 21 at a connecting point A (see FIGS. 7A and 7B), is provided so as to interlock with the hook member 21. Further, at the other end of the hook interlocking member 23, a claw 23a is provided. The claw 23a has a shape that makes it possible to engage with a protrusion 24a provided so as to protrude from a side surface of the latching member 24.

Figure 6B:
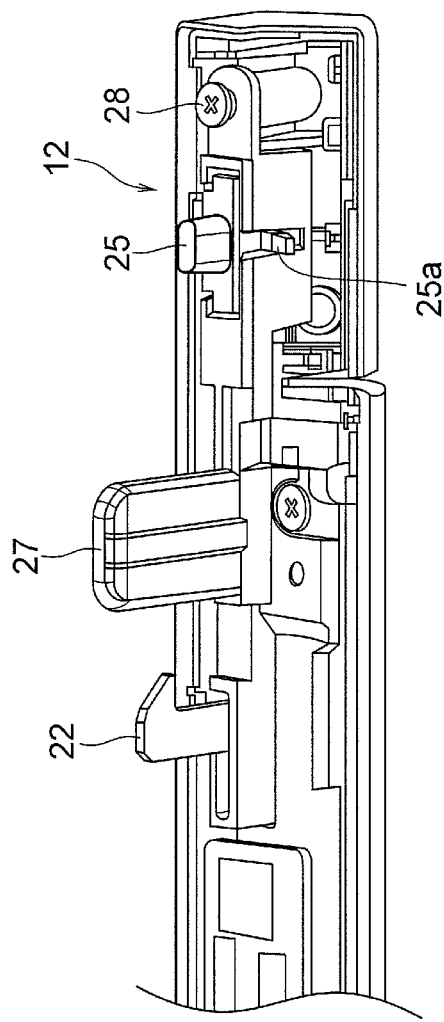
FIG. 6B is a perspective view of a right-side portion of the mounting part 12 in the same state as that in FIG. 6A.

Here, as shown in FIG. 6B, also on the latching member 25 at the right side of the mounting part 12, a protrusion 25a is provided. This protrusion 25a does not engage with the hook interlocking member 23. Therefore, the protrusion 25a does not need to be provided on the latching member 25. However, it is possible to suppress the increase in the number of components, by using the component with the same shape as the latching member 24.

Figure 7A:
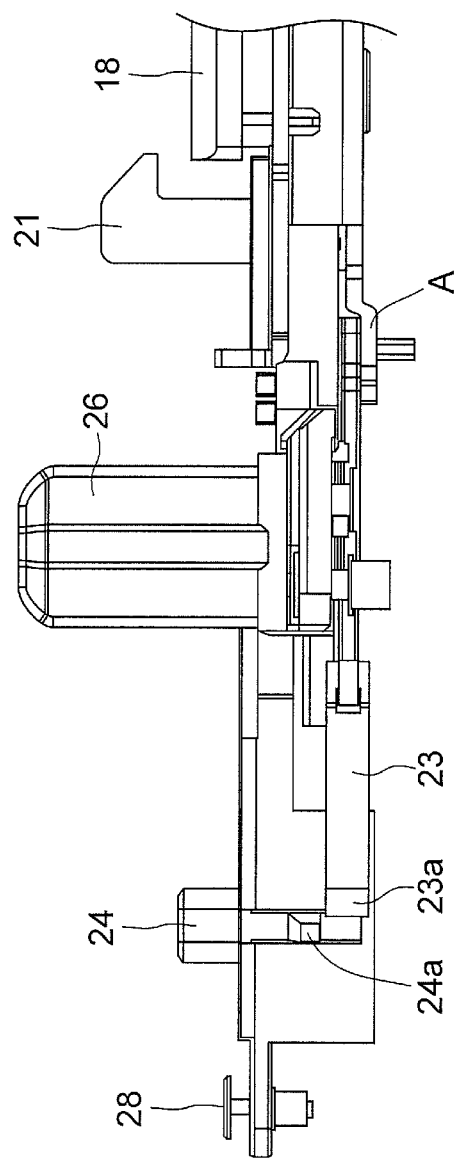
FIG. 7A is a partial side view of the mounting part 12 in a non-mounted state in which the electronic apparatus 2 is not mounted on the mounting part 12.
Figure 7B:
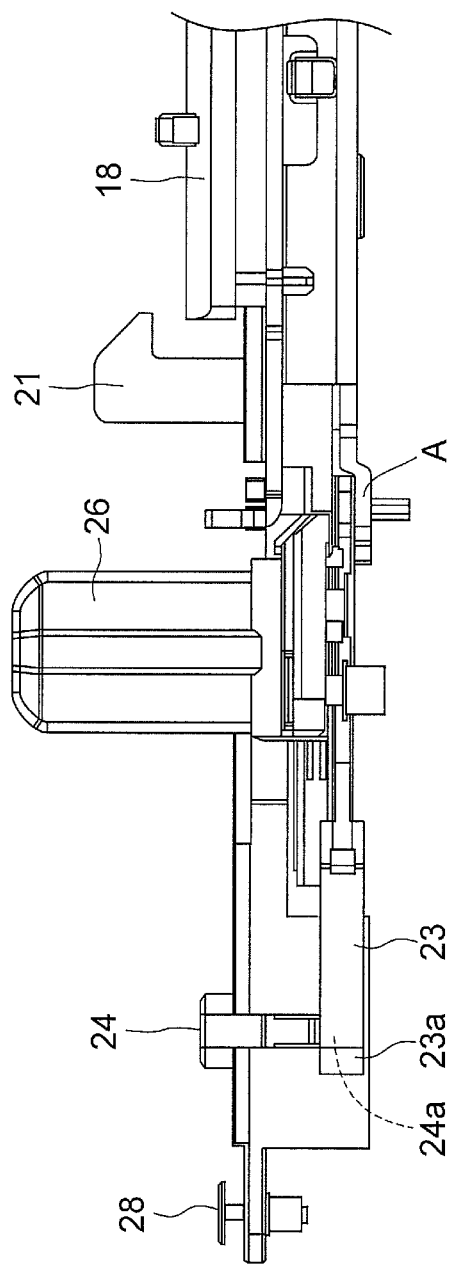
FIG. 7B is a partial side view of the mounting part 12 when a demount-operating part 18 is operated in a mounted state in which the electronic apparatus 2 is mounted.
Figure 8:
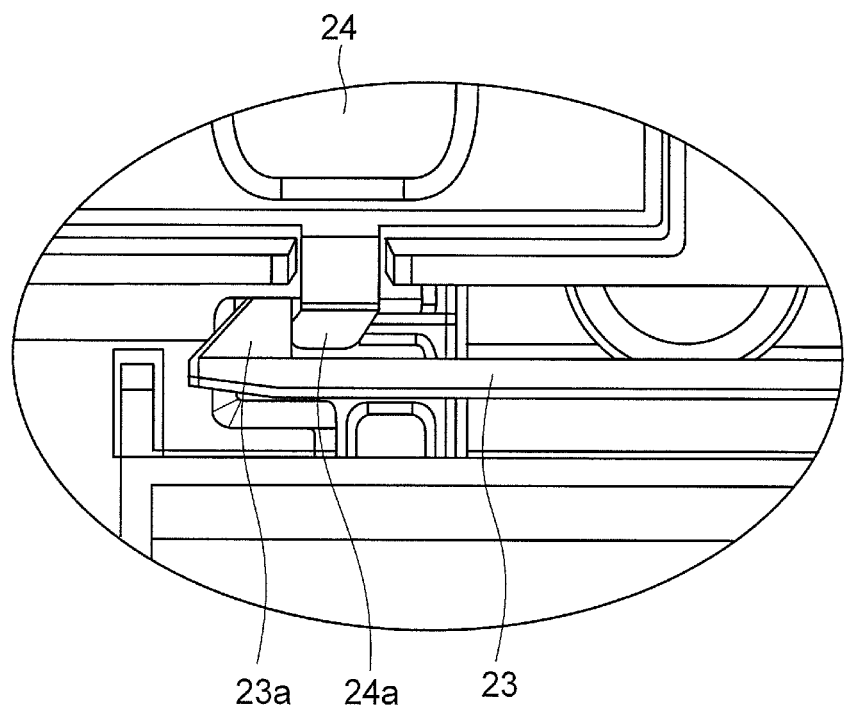
FIG. 8 is a top view showing a state in which a hook interlocking member 23 is latched by a latching member 24.

Next, the behavior of the mounting part 12 at the mounting time and demounting time of the electronic apparatus 2 will be explained with reference to FIGS. 7A, 7B and FIG. 8. FIG. 7A is a partial side view of the mounting part 12 in a non-mounted state in which the electronic apparatus 2 is not mounted on the mounting part 12. FIG. 7B is a partial side view of the mounting part 12 when the demount-operating part 18 has been operated in a mounted state in which the electronic apparatus 2 (not shown) is mounted. FIG. 8 is a top view showing a state in which the hook interlocking member 23 is latched by the latching member 24.

As shown in FIG. 7A, in the non-mounted state in which the electronic apparatus 2 is not mounted on the mounting part 12, the hook member 21 is at the locking position, and the latching member 24 is pressed upward by the elastic member (not shown). In other words, when the electronic apparatus 2 is not mounted on the docking device 1, the latching member 24, by the biasing force of the elastic member, is pressed up to a level (first level) at which it does not latch the hook interlocking member 23, so that it protrudes from the mounting surface 12e. As shown in FIG. 7A, in the non-mounted state of the electronic apparatus 2, the protrusion 24a of the latching member 24 is positioned at an upper side relative to the claw 23a of the hook interlocking member 23, and cannot engage with the claw 23a.

On the other hand, as shown in FIG. 7B, in the mounted state in which the electronic apparatus 2 is mounted on the mounting part 12, the latching member 24 abuts the electronic apparatus 2 to be pressed down, and the protrusion 24a gets to be at the same level as the claw 23a. Therefore, the protrusion 24a can engage with the claw 23a. Thus, when the electronic apparatus 2 is mounted on the docking device 1, the latching member 24 is pressed down to a level (second level) at which it can latch the hook interlocking member 23, against the biasing force of the elastic member, by the pressing force from the electronic apparatus 2.

When the hook members 21, 22 slidingly move from the locking positions to the unlocking positions by the operation to the demount-operating part 18 in the mounted state of the electronic apparatus 2, the hook interlocking member 23, which interlocks with the hook members 21, 22, is latched by the latching member 24, as shown in FIG. 8. For more detail, when the latching member 24 is at the second level, the hook interlocking member 23 slidingly moves in the direction of the latching member 24. Then, the claw 23a of the hook interlocking member 23 and the protrusion 24a of the latching member 24 engage, and thereby, the hook interlocking member 23 is latched by the latching member 24.

Since the hook interlocking member 23 is latched by the latching member 24, the hook members 21, 22 are fixed to the unlocking positions. Therefore, even when a user releases the operation to the demount-operating part 18, the hook members 21, 22 do not return to the original locking positions. Thereby, the user can easily demount the electronic apparatus 2 from the docking device 1.

Next, the behavior when the electronic apparatus 2 is demounted from the docking device 1 will be explained. When the electronic apparatus 2 is demounted from the docking device 1, the latching member 24 is pressed up from the second level to the first level, by the biasing force of the elastic member. Thereby, the latching member 24 unlatches the hook interlocking member 23, and the hook member 21 returns to the locking position.

As described above, in the docking device 1 according to the embodiment, the latching member 24 is pressed down to the level (second level) at which the protrusion 24a can engage with the hook interlocking member 23, in the mounted state of the electronic apparatus 2. Therefore, when the hook members 21, 22 slidingly move from the locking positions to the unlocking positions by the operation to the demount-operating part 18, the hook interlocking member 23 slidingly moves while interlocking with the hook members 21, 22, and is latched by the latching member 24. Thereby, the hook members 21, 22 are fixed to the unlocking positions. Accordingly, even when a user releases the operation to the demount-operating part 18, the hook members 21, 22 do not return to the original locking positions.

Therefore, according to the embodiment, the user can easily demount the electronic apparatus 2 from the docking device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A docking device on which an electronic apparatus is mounted in a demountable manner, comprising:
    a hook configured to slidingly move from a locking position where the hook engages with an engaging hole of the electronic apparatus to an unlocking position where the hook does not engage with the engaging hole by an operation to a demount-operating part;
    a hook interlock configured to interlock with the hook; and
    a latch configured to be pressed up to a first level where the latch does not latch the hook interlock by a biasing force of an elastic, and to protrude from a mounting surface where the electronic apparatus is mounted when the electronic apparatus is not mounted on the docking device,
    the latch further configured to be pressed down to a second level where the latch is capable of latching the hook interlock against the biasing force of the elastic by a pressing force from the electronic apparatus when the electronic apparatus is mounted on the docking device.

2. The docking device of claim 1, wherein, when the electronic apparatus is demounted from the docking device, the latch is pressed up from the second level to the first level by the biasing force of the elastic, so that the latch unlatches the hook interlock and the hook returns to the locking position.

3. The docking device of claim 1, wherein the hook interlock is connected with the hook at one end and has a claw at the other end, the latch has a protrusion from a side surface, and the claw engages with the protrusion so that the latch latches the hook interlock when the latch is at the second level.

4. The docking device of claim 1, further comprising an another latch configured to protrude from the mounting surface by the biasing force of the elastic when the electronic apparatus is not mounted on the docking device.

5. The docking device of claim 4, wherein the another latch does not engage with the hook interlock even when the operation to the demount-operating part is performed to the electronic apparatus mounted on the docking device.

6. The docking device of claim 4, wherein the latch and the another latch are arranged roughly symmetrically with respect to a center of the mounting surface.

7. The docking device of claim 1, wherein the demount-operating part slidingly moves in a designated direction by the operation to the demount-operating part, and the hook slidingly moves in the direction while interlocking with the demount-operating part.

8. The docking device of claim 1, further comprising an another hook configured to be capable of engaging with an another engaging hole of the electronic apparatus, and to interlock with the demount-operating part and the another hook.

9. The docking device of claim 1, further comprising a guide-pin configured to protrude from the mounting surface between the hook and the latch, and to be inserted into a guide-pin inserting hole of the electronic apparatus.

10. A docking device on which an electronic apparatus is mounted in a demountable manner, comprising:

a body; and a mount configured to be attached in a rotatable manner to one edge of the body through a hinge, where the electronic apparatus is mounted thereon, wherein:

the mount comprises a supporting surface which connects a back surface opposite to a display surface and a bottom surface opposite to the top surface when the display surface of the electronic apparatus is closed and faces a top surface of the body;

the supporting surface comprises a contacting surface which contacts with a placing surface when the display surface is open with an angle to the top surface;

the placing surface on which the docking device is placed; and the contacting surface is positioned backward of a rotation axis of the hinge when the display surface of the electronic apparatus is open.

11. The docking device of claim 10, wherein the supporting surface comprises a first surface connected with the back surface when the electronic apparatus is mounted on the docking device, a second surface connected with the first surface, and a third surface connected with the second surface and the bottom surface, wherein the second surface contacts with the placing surface when the display surface is open.

12. The docking device of claim 11, wherein the second surface is roughly parallel to the placing surface when the display surface has a designated angle from the top surface.

13. The docking device of claim 10, wherein the mount raises the body when the display surface is open such that the one edge of the body is higher than the other edge of the body.

14. The docking device of claim 11, wherein a cushion is provided on the second surface of the supporting surface.

* * * * *